US011445043B2

(12) United States Patent
Connelly et al.

(10) Patent No.: US 11,445,043 B2
(45) Date of Patent: Sep. 13, 2022

(54) EPHEMERAL AND PRIVATE BEACON NETWORK

(71) Applicant: Fwd Inc., Huntingdon Valley, PA (US)

(72) Inventors: Sean P. Connelly, Huntingdon Valley, PA (US); Ion Marusic, South Holland (NL); Jeffrey Synnestvedt, Cookeville, TN (US)

(73) Assignee: FWD Inc., Huntingdon Valley, PA (US)

( * ) Notice: Subject to any disclaimer, the term of this patent is extended or adjusted under 35 U.S.C. 154(b) by 0 days.

(21) Appl. No.: 16/669,723

(22) Filed: Oct. 31, 2019

(65) Prior Publication Data

US 2020/0137181 A1 Apr. 30, 2020

Related U.S. Application Data

(60) Provisional application No. 62/753,630, filed on Oct. 31, 2018.

(51) Int. Cl.
*H04L 67/54* (2022.01)
*H04L 67/104* (2022.01)
(Continued)

(52) U.S. Cl.
CPC .......... *H04L 67/54* (2022.05); *G06Q 50/01* (2013.01); *H04L 67/104* (2013.01); *H04L 67/52* (2022.05);
(Continued)

(58) Field of Classification Search
CPC ....... H04L 67/24; H04L 67/104; H04L 67/18; H04L 63/0428; H04L 67/12; H04L 63/0407; H04L 12/1895; H04L 2209/38; H04L 2209/805; H04L 51/32; H04L 63/0492; H04L 63/065; H04L 63/104; H04L 67/02; H04L 67/10; H04L 67/1002; H04L 67/146; H04L 67/26; H04L 67/306; H04L 9/0833; H04L 9/0861; H04L 9/0891; H04L 9/321; H04L 9/3213; G06Q 50/01; G06Q 10/06; G06Q 10/10; G06Q 20/02; G06Q 20/04; G06Q 20/06; G06Q 20/308; G06Q 20/382; G06Q 20/389; G06Q 20/4014; G06Q 20/4016; G06Q 20/405; G06Q 2220/00; G06Q 30/0214; G06Q 30/0261; G06Q 30/0269; G06Q 30/0277;
(Continued)

(56) References Cited

U.S. PATENT DOCUMENTS 9,805,601 B1 * 10/2017 Fields ................ G07C 5/02
10,055,967 B1 * 8/2018 Fields ................ H04L 51/32
10,235,882 B1 * 3/2019 Aoude ................ G06N 5/046
10,448,196 B2 * 10/2019 Kern, Jr. ............. B60R 25/1012
(Continued)

FOREIGN PATENT DOCUMENTS

WO 2020/092687 A1 5/2020

OTHER PUBLICATIONS

International Search Report and Written Opinion received for PCT Application No. PCT/US2019/059024, dated Jan. 16, 2020, 9 pages.

*Primary Examiner* — David R Lazaro
(74) *Attorney, Agent, or Firm* — Schott, P.C.

(57) ABSTRACT

A peer to peer service, toolkit, and data feed standard that broadcasts real-time geolocations, provides proximity alerts, records and shares messages that include audio, video, and images through an encrypted technology platform that offers user-initiated privacy controls.

15 Claims, 12 Drawing Sheets

(51) Int. Cl.
*G06Q 50/00* (2012.01)
*H04W 4/02* (2018.01)
*H04W 4/029* (2018.01)
*H04W 12/02* (2009.01)
*H04W 4/021* (2018.01)
*H04L 67/52* (2022.01)

(52) U.S. Cl.
CPC ........... *H04W 4/021* (2013.01); *H04W 4/023* (2013.01); *H04W 4/029* (2018.02); *H04W 12/02* (2013.01)

(58) Field of Classification Search
CPC ..... H04W 4/023; H04W 4/029; H04W 12/02; H04W 4/025; H04W 4/80; H04W 4/90; H04W 67/14; H04W 8/005; H04W 12/04; H04W 12/041; H04W 12/06; H04W 12/75; H04W 4/021; H04W 4/026; H04W 4/027; H04W 4/06; H04W 4/21; H04W 4/40; H04W 48/16; H04W 8/26; H04W 84/005; H04W 84/18; G08G 1/166; G08G 1/005; G08G 1/162; G08G 1/0112; G08G 1/0116; G08G 1/0141; G08G 1/017; G08G 1/0193; G08G 1/096716; G08G 1/096725; G08G 1/163; G08G 1/0129; G08G 1/0133; G08G 1/0137; G08G 1/0175; G08G 1/052; G08G 1/096741; G08G 1/096775; G08G 1/096791; G08G 1/123; G08G 1/161; G08G 1/164

See application file for complete search history.

(56) References Cited

U.S. PATENT DOCUMENTS

| | | | |
|---|---|---|---|
| 10,733,311 B2* | 8/2020 | Chen | G06Q 40/08 |
| 2007/0083323 A1* | 4/2007 | Rosenberg | G01S 5/0027 |
| | | | 701/532 |
| 2007/0270119 A1 | 11/2007 | Dorogusker et al. | |
| 2011/0090093 A1* | 4/2011 | Grimm | G08G 1/162 |
| | | | 340/901 |
| 2012/0044063 A1 | 2/2012 | McClellan et al. | |
| 2013/0127638 A1* | 5/2013 | Harrison | G08G 1/166 |
| | | | 340/903 |
| 2013/0205404 A1 | 8/2013 | King | |
| 2013/0282271 A1 | 10/2013 | Rubin et al. | |
| 2014/0162601 A1* | 6/2014 | Kim | H04W 12/06 |
| | | | 455/411 |
| 2014/0257953 A1* | 9/2014 | Kaplan | G06Q 30/0214 |
| | | | 705/14.16 |
| 2014/0280941 A1* | 9/2014 | Maguire | G06Q 50/01 |
| | | | 709/225 |
| 2015/0156567 A1* | 6/2015 | Oliver | G08B 21/24 |
| | | | 340/870.07 |
| 2017/0053461 A1* | 2/2017 | Pal | H04W 4/027 |
| 2017/0101054 A1* | 4/2017 | Dusane | G08G 1/205 |
| 2017/0124878 A1* | 5/2017 | Enright | G08G 1/166 |
| 2017/0330233 A1* | 11/2017 | Bruno | G06Q 30/0277 |
| 2018/0079463 A1* | 3/2018 | Pearce | B60Q 1/0023 |
| 2018/0103339 A1* | 4/2018 | Roundtree | H04W 4/80 |
| 2018/0108243 A1* | 4/2018 | Scherer | G08B 21/0269 |
| 2018/0212773 A1* | 7/2018 | Kushnirsky | H04L 9/0891 |
| 2018/0372864 A1* | 12/2018 | Schmidt | G01S 5/0027 |
| 2019/0027028 A1* | 1/2019 | Fields | G08G 1/017 |
| 2019/0036887 A1* | 1/2019 | Miller | G06Q 20/02 |
| 2019/0261724 A1* | 8/2019 | Chen | A42B 3/0433 |
| 2019/0306677 A1* | 10/2019 | Basu | H04W 4/027 |
| 2020/0082699 A1* | 3/2020 | Jati | H04W 4/48 |
| 2020/0137181 A1* | 4/2020 | Connelly | H04L 67/104 |
| 2021/0407229 A1* | 12/2021 | Schoenfelder | H04W 4/80 |

* cited by examiner

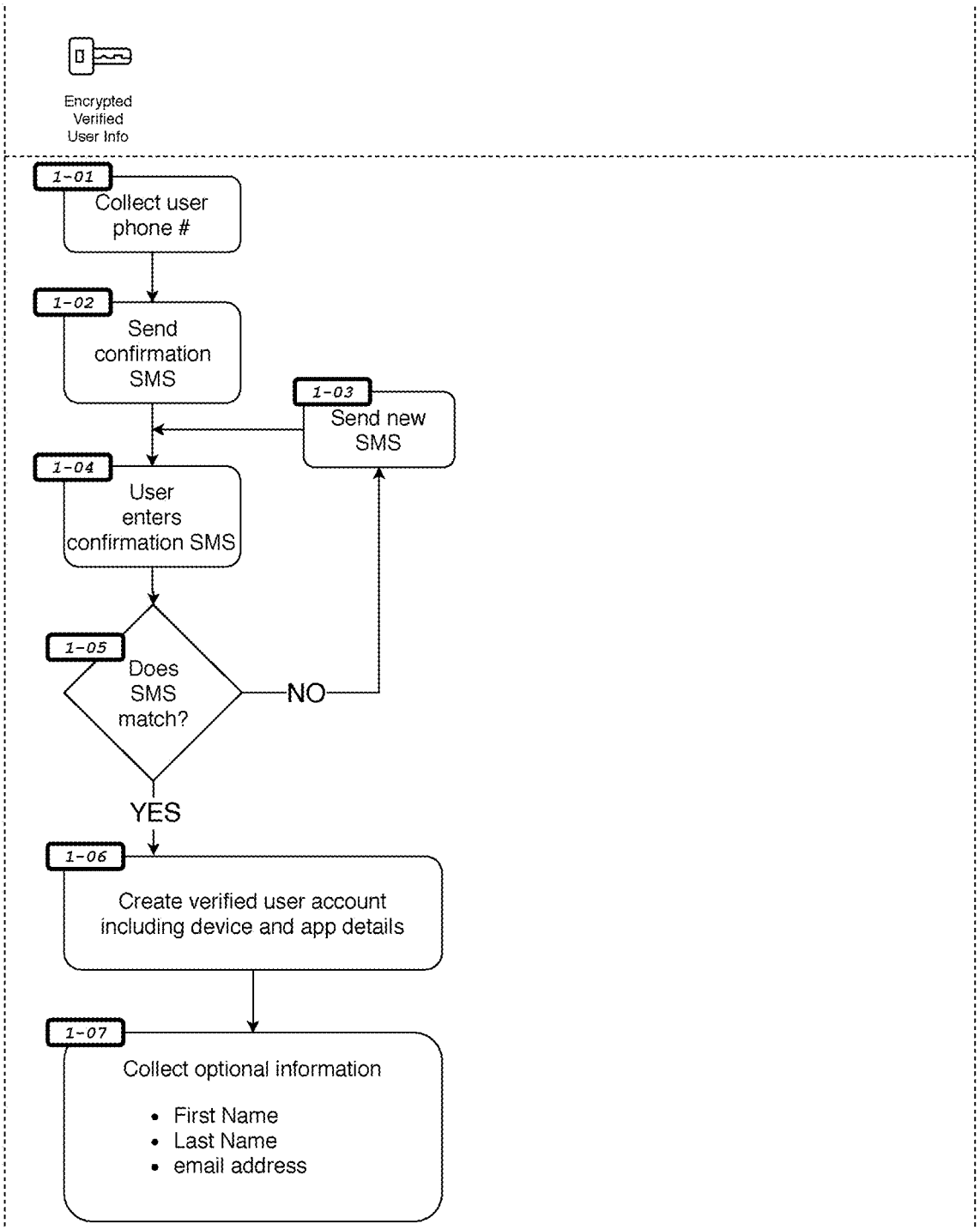

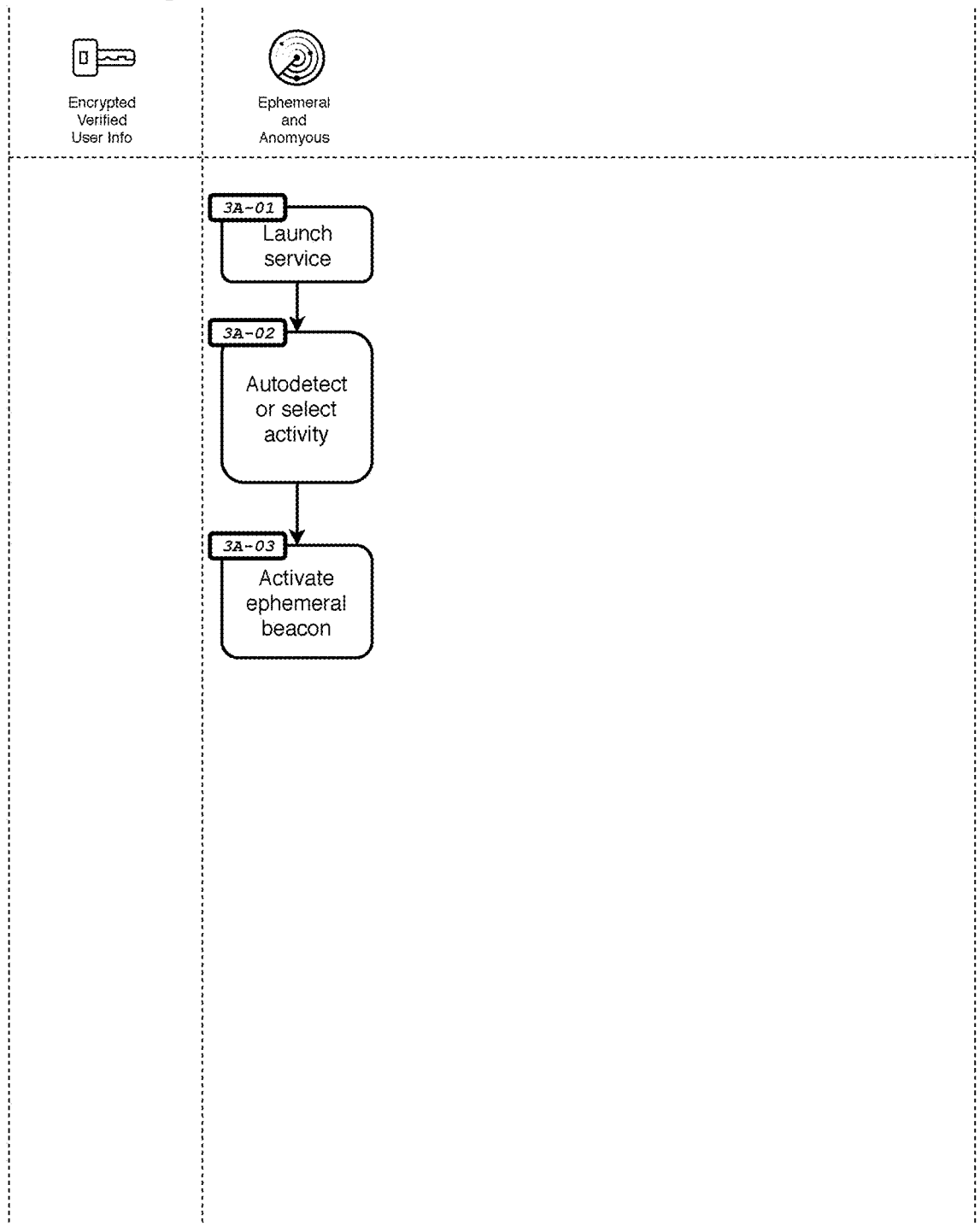

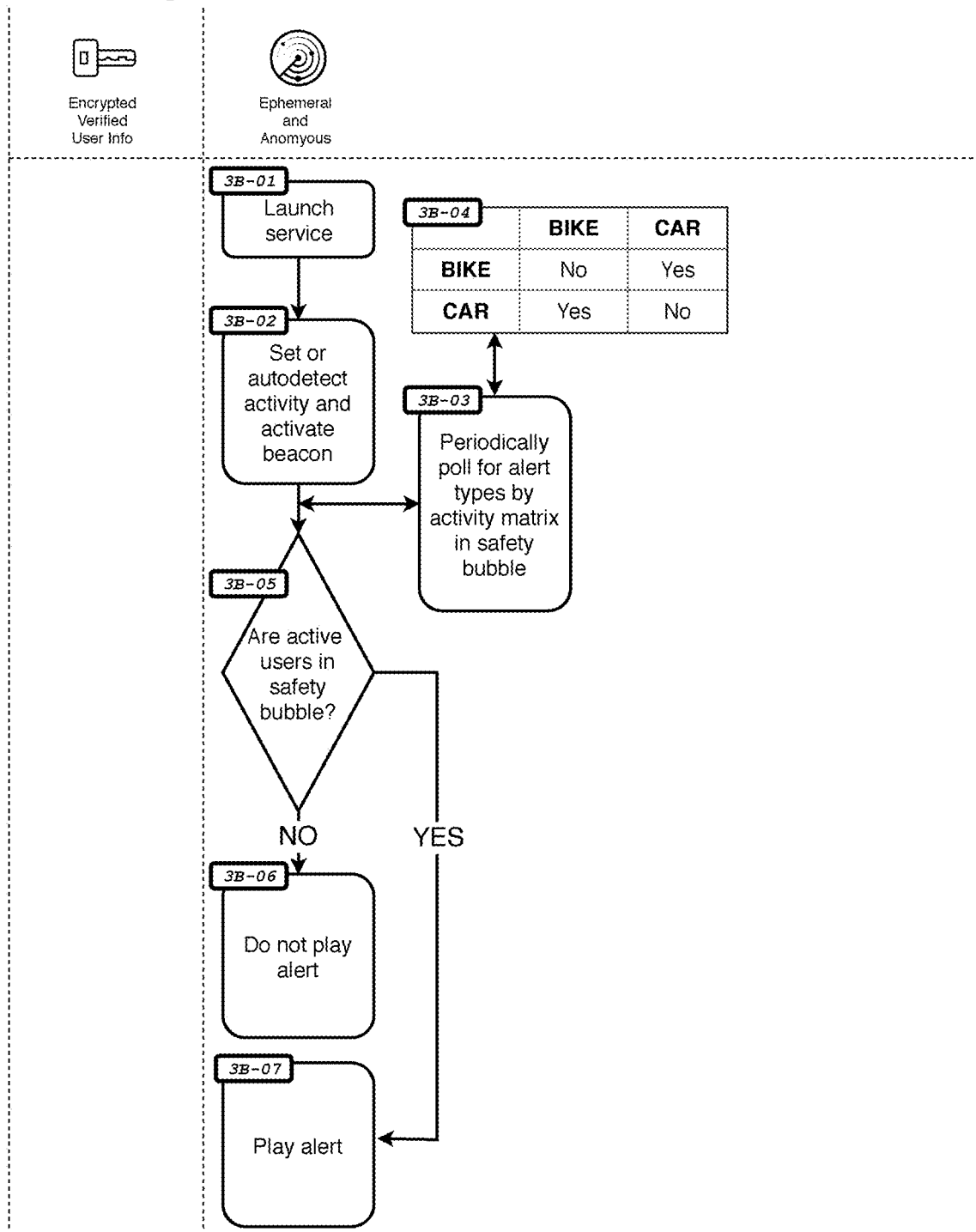

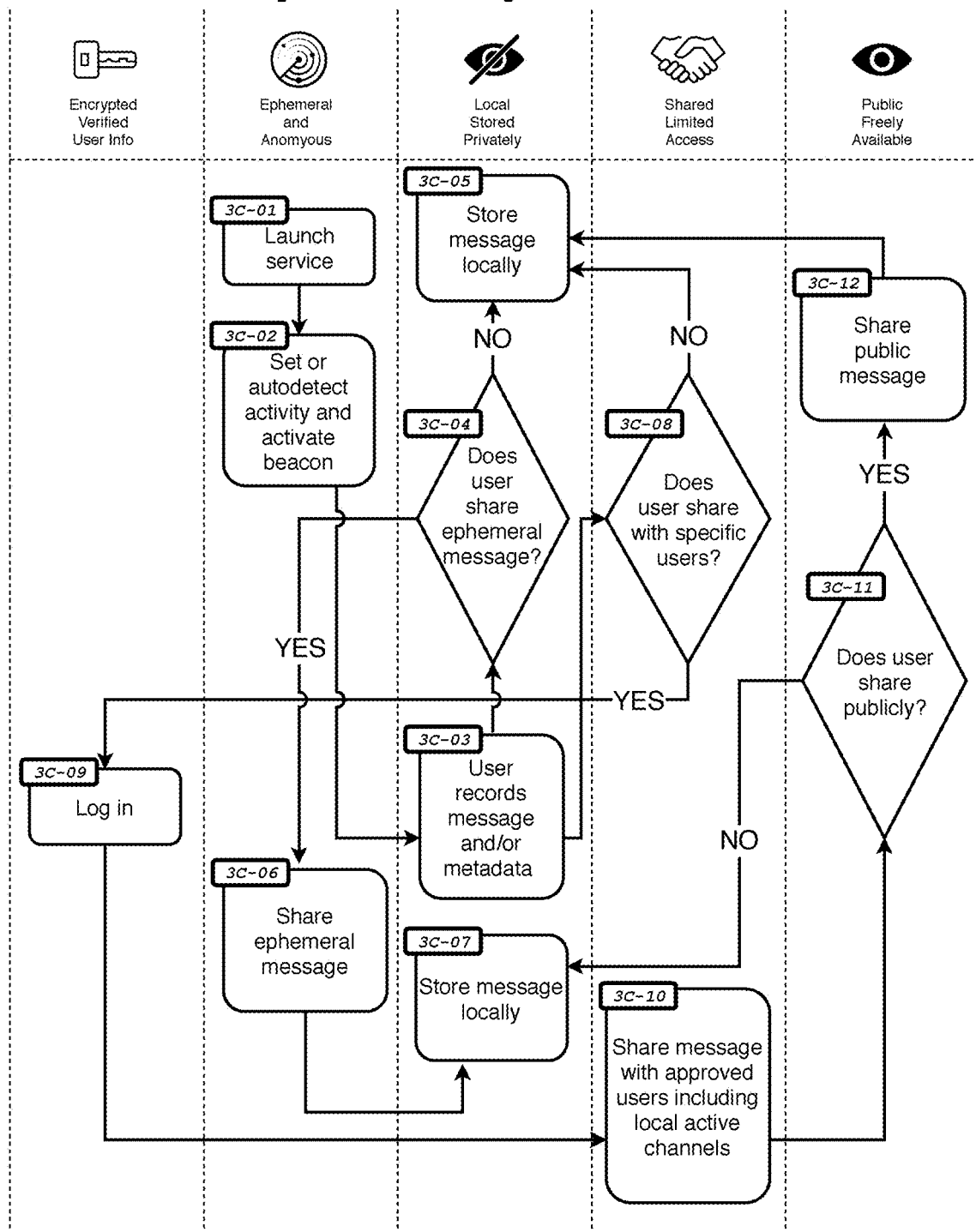

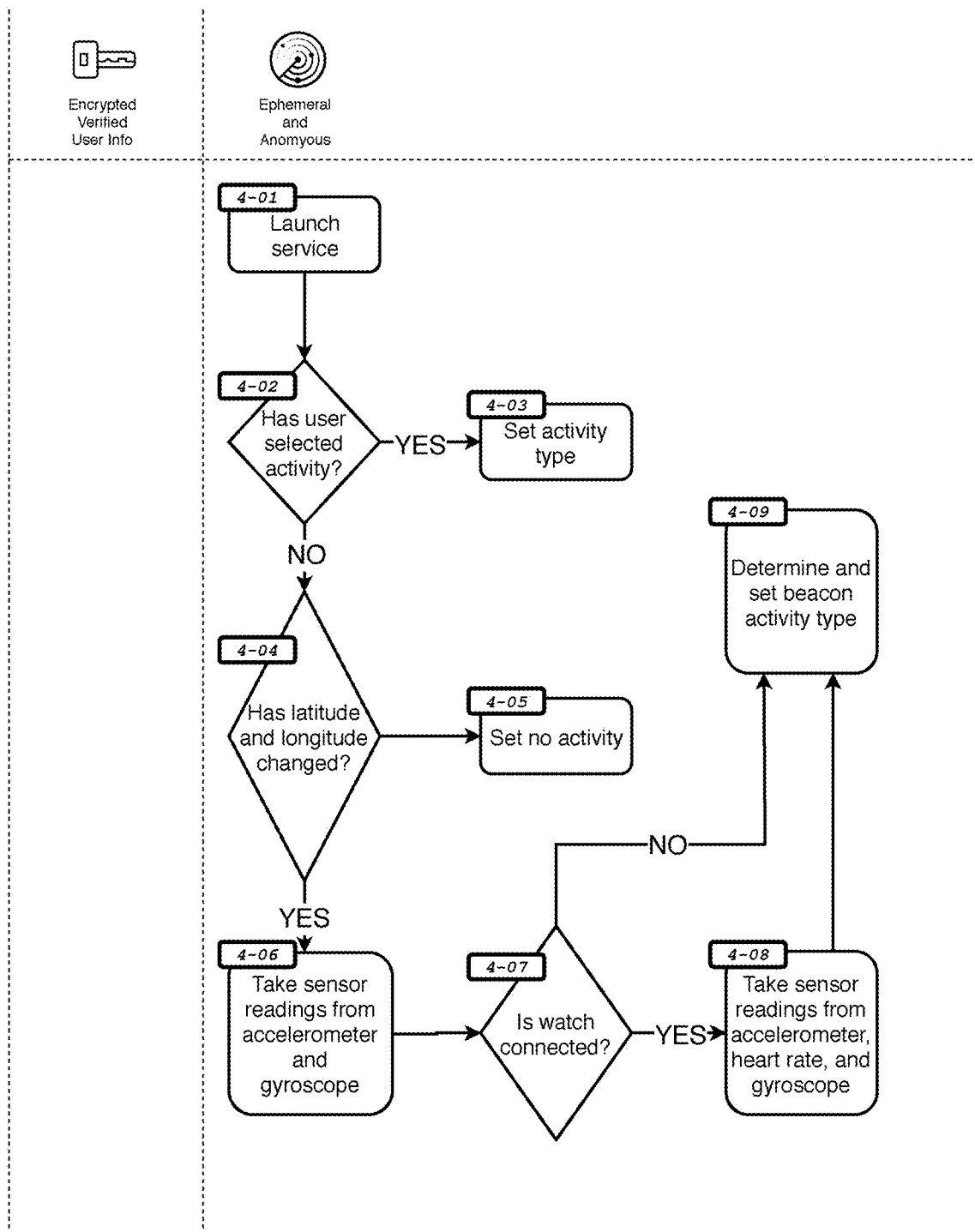

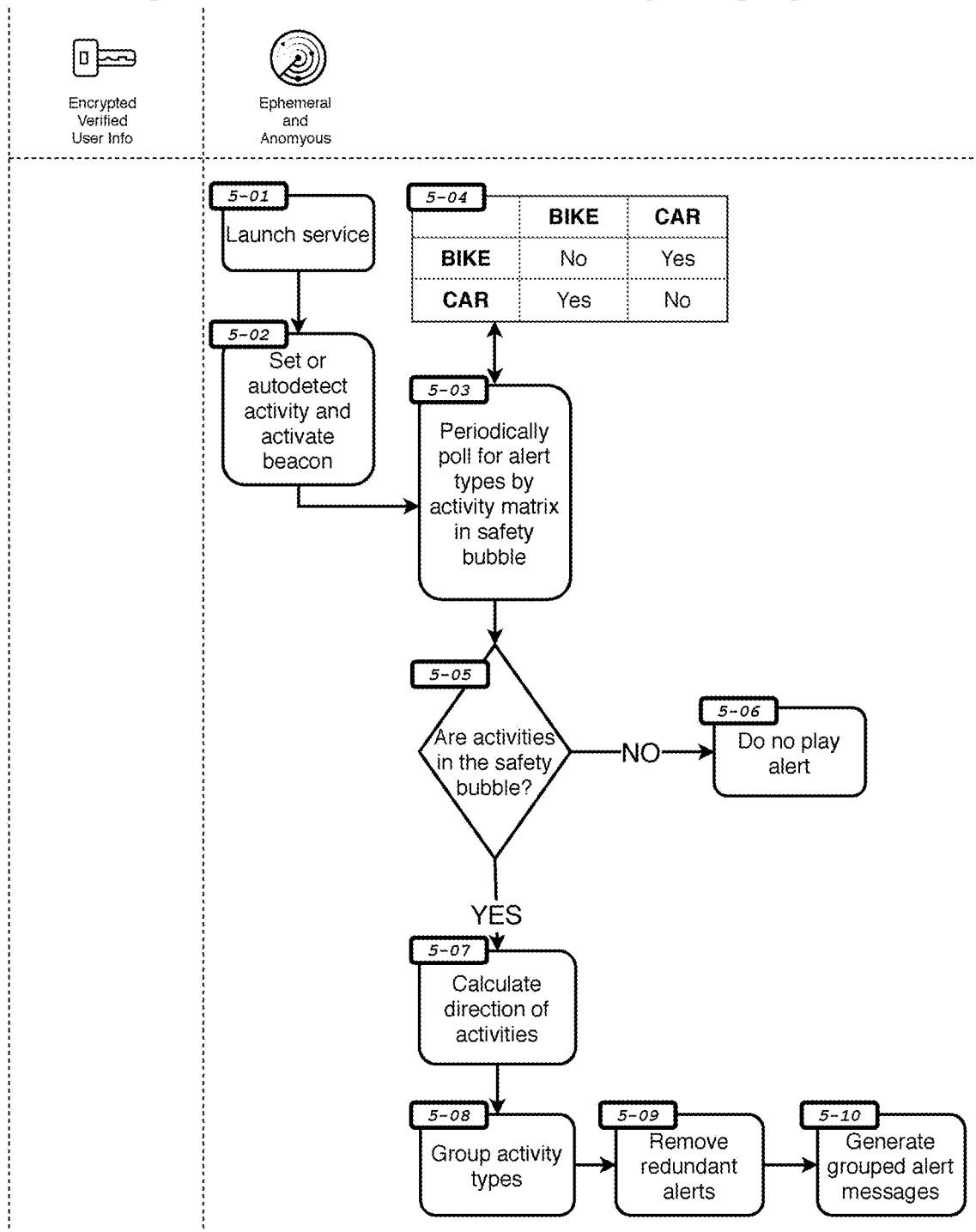
FIG. 5 Ephemeral Alerts Method Including Grouping

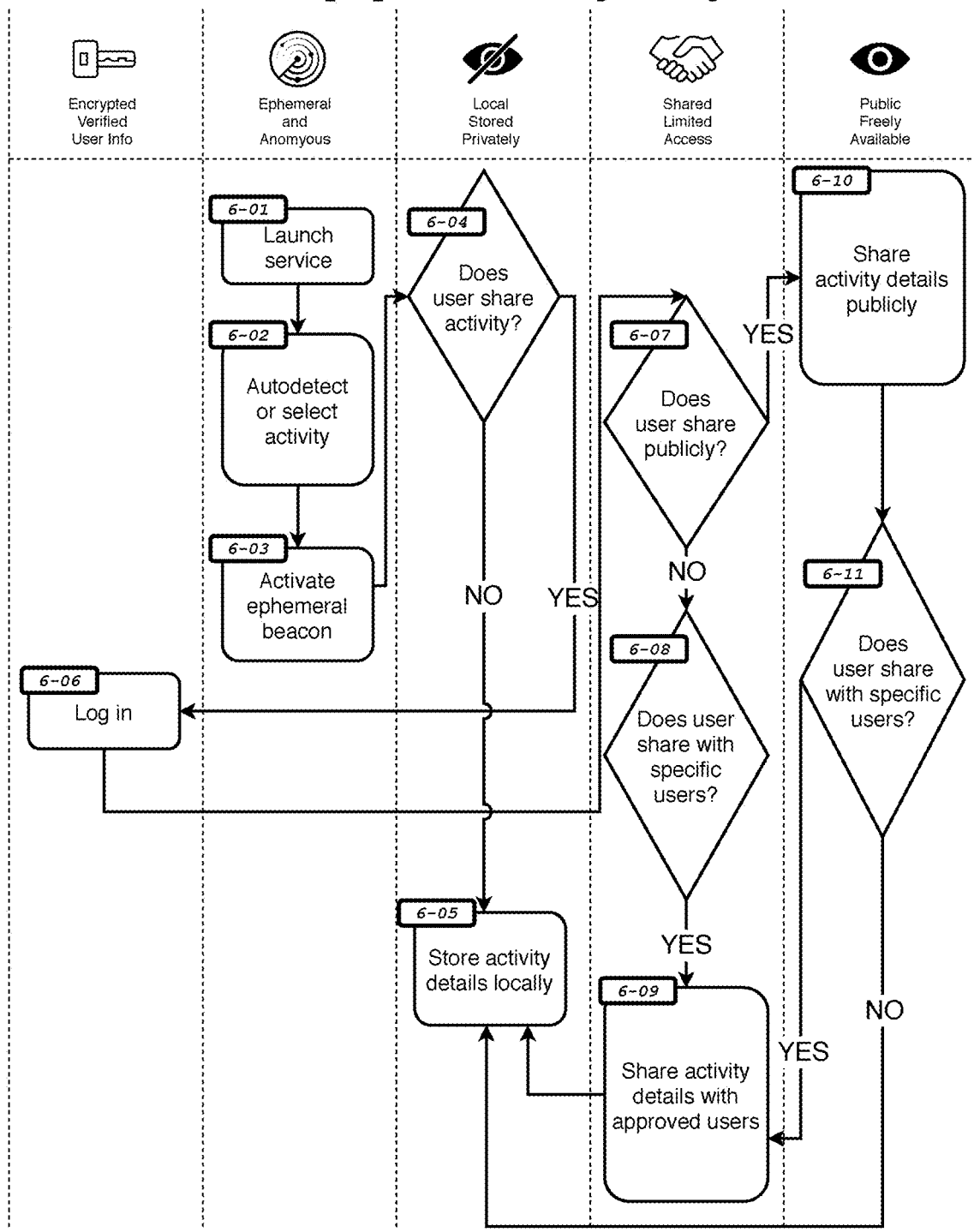

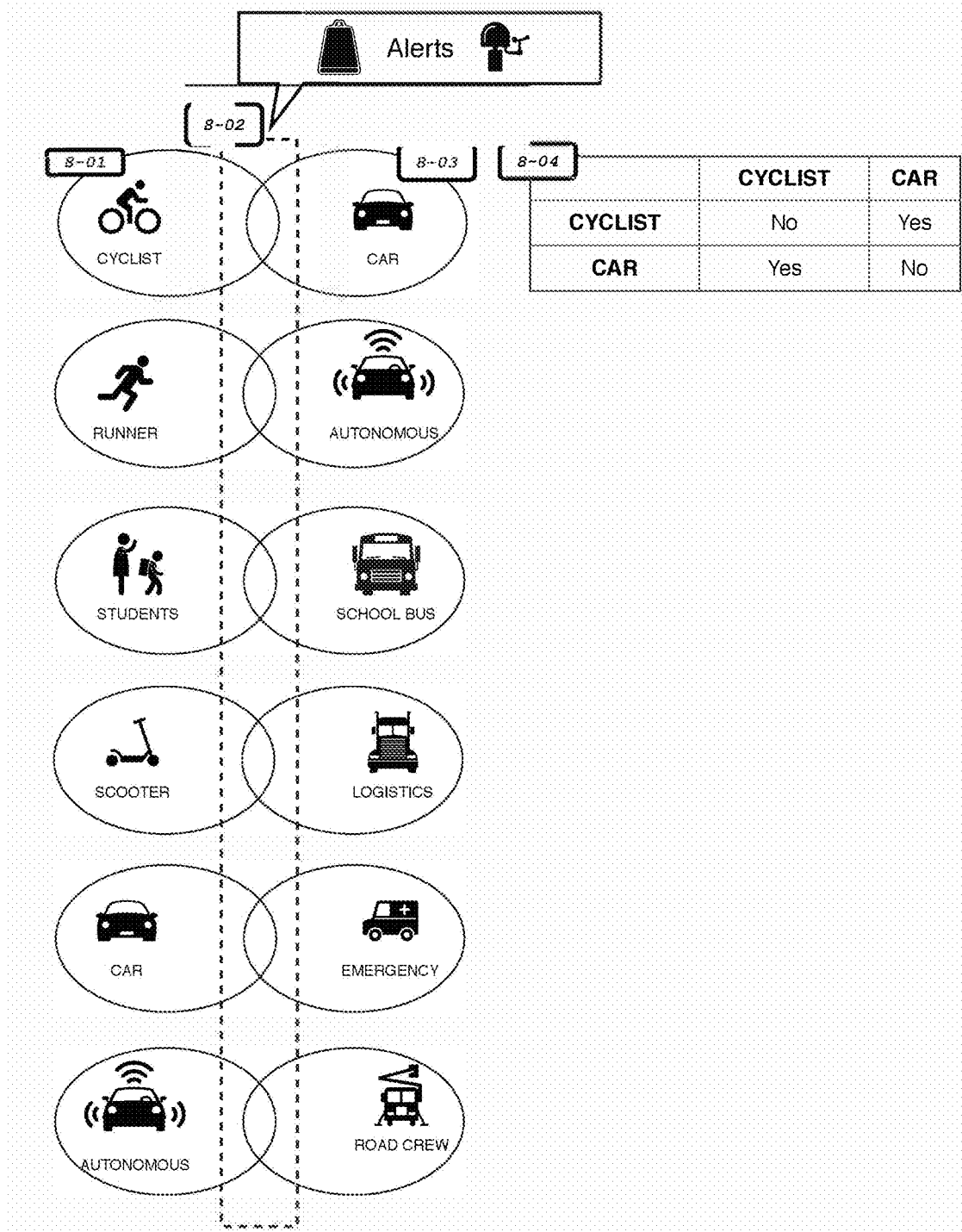
FIG. 7 Safety Bubbles - Variable Size

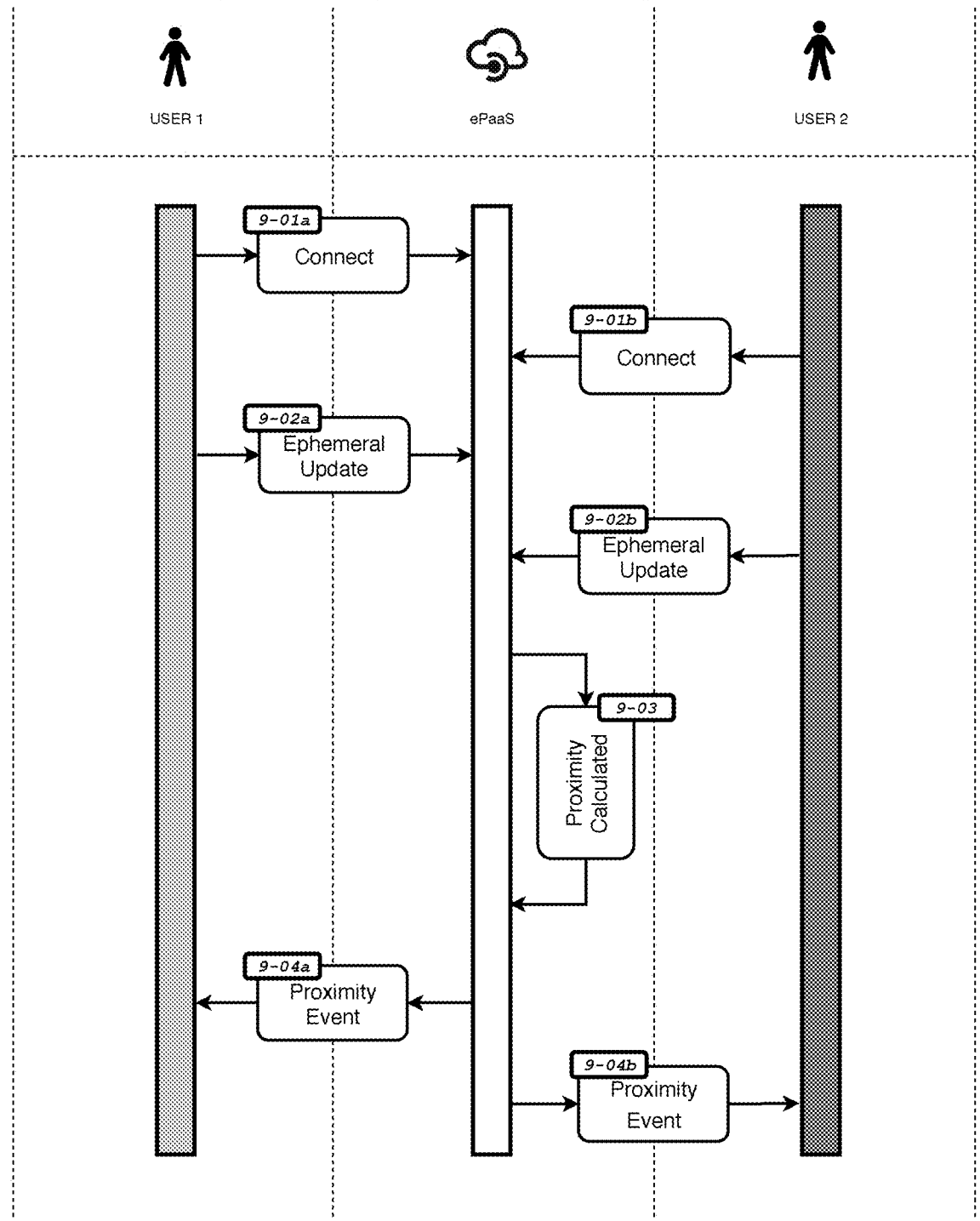

EPHEMERAL AND PRIVATE BEACON NETWORK

BACKGROUND

Travelers on roads, paths, or waterways do not travel alone. They share their travel with those around them, whether they are in separate vehicles, on foot, or in the air, there exists a shared space that all travelers occupy.

Within this shared space, especially on the most common shared space of the road, there may be trucks, buses, cars, motorcycles, scooters—all powered by engines—interacting with cyclists, skateboarders, and runners. The human-powered travelers are particularly vulnerable on the roads given their slower speeds and lack of protection. The current ways of accident avoidance and communication on the road for the human-powered travelers include awareness amplifiers like lights and reflectors and warning signals like warnings and horns.

Given the amount of network-connected smart travelers, there exists a need to take advantage of a networked traveling public in the interest of communication and safety. But many services that provide connections have a problem with careless handling of users' private data, including the users' current locations. This kind of information can serve a good use without compromising users' privacy.

SUMMARY OF THE EMBODIMENTS

The ephemeral Proximity as a Service (ePaaS) system assists in networked travel through sharing real-time geolocations, providing proximity alerts, recording and sharing messages that include audio, video, and images through an encrypted technology platform that offers user-initiated privacy controls, and other features. The "ephemeral" nature of the system is that the location beacons and in some cases the communications shared through the network are temporary in nature and available based on location and/or information type. For example, an "alert" about a damaged road might only be available to a user as they enter a geographical area, or it may be temporary if it is something like a weather alert for a temporary condition like fog.

There is not much camaraderie between drivers and cyclists today and it has become increasingly more unsafe and for cyclists on the road as driver distractions have increased. Thus, the initial use case discussed herein is one mostly based on communications between cyclists and drivers, however, it has broad use cases across interactions between people and vehicles (autonomous and/or manned).

EPaaS provides cyclists with the ability to share their location though an app and their connected watches/devices or an API to allow drivers who are running the same app or another application that is connected to an ePaaS service to receive alerts as they are approaching cyclists. This potentially saves lives by avoiding accidents. During a cycling or driving session, users may speak into their phones or connected watches to record audio files that include the geolocation and available sensor related data at the time of the recording.

EPaaS may provide each user with the ability to control their own privacy settings enabling them to: (1) keep their geolocation history, messages and recordings private, (2) hare their real-time location with ephemeral beacons, (3) share their geolocation history, messages, and recordings with individuals or groups, or (4) share their geolocation history, messages, and recordings publicly as they see fit.

EPaaS may provide a real-time feed of all connected users location data anonymously.

BRIEF DESCRIPTION OF THE DRAWINGS

FIG. 2 shows optional registration via mobile device method.

FIG. 3A shows an ephemeral beacons method depicting the method of the user activating the ephemeral beacons associated with ePaaS along with subsequent options for how those beacons could be shared outside of the default ephemeral and anonymous state.

FIG. 3B is a flow diagram showing how ephemeral alerts are activated and received.

FIG. 3C is a flow diagram depicting how ephemeral messages are generated and shared.

FIG. 4 shows the flow of autodetecting the activity type associated with an active user session.

FIG. 5 is a flow diagram detailing the method for grouping ephemeral messages.

FIG. 6 is a flow diagram of the method of sharing the activity history of the user.

FIG. 7 is an illustration that shows two factors of the "safety bubbles" or channels.

FIG. 8 shows multiple user ephemeral proximity alerts methods.

DETAILED DESCRIPTION OF THE EMBODIMENTS

Hardware and Network Overview

Figure 1A:
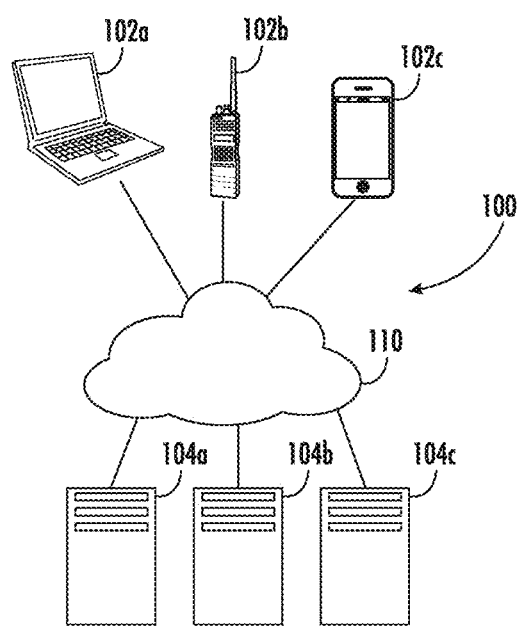
FIG. 1A shows an embodiment of a network environment.

The system and method for an ephemeral Proximity as a Service (ePaaS) system as described herein may be implemented using system and hardware elements. For example, FIG. 1A shows an embodiment of a network 100 with one or more clients 102a, 102b, 102c that may be local machines, personal computers, nodes, mobile devices, servers, tablets that communicate through one or more networks 110 with servers 104a, 104b, 104c, which may be hosts to networks themselves. It should be appreciated that a client 102a-102c may serve as a client seeking access to resources provided by a server and/or as a server providing access to other clients.

The network 110 may include wired or wireless links. If it is wired, the network may include coaxial cable, twisted pair lines, USB cabling, or optical lines. The wireless network may operate using BLUETOOTH, Wi-Fi, Worldwide Interoperability for Microwave Access (WiMAX), infrared, or satellite networks. The wireless links may also include any cellular network standards used to communicate among mobile devices including the many standards prepared by the International Telecommunication Union such as 3G, 4G, and LTE. Cellular network standards may include GSM, GPRS, LTE, WiMAX, and WiMAX-Advanced. Cellular network standards may use various channel communications such as FDMA, TDMA, CDMA, or SDMA. The various networks may be used individually or in an interconnected way and are thus depicted as shown in FIG. 1A as a cloud.

The network 110 may be located across many geographies and may have a topology organized as point-to-point, bus, star, ring, mesh, or tree. The network 110 may be an overlay network which is virtual and sits on top of one or more layers of other networks.

The network 110 may use certain protocols including the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer, or the link layer. The network 110 may be a type of a broadcast network, a telecommunications network, a data communication network, or a computer network.

In most cases, every device on a network has a unique identifier. In the TCP/IP protocol, the unique identifier for a computer is an IP address. An IPv4 address uses 32 binary bits to create a single unique address on the network. An IPv4 address is expressed by four numbers separated by dots. Each number is the decimal (base-10) representation for an eight-digit binary (base-2) number, also called an octet. An IPv6 address uses 128 binary bits to create a single unique address on the network. An IPv6 address is expressed by eight groups of hexadecimal (base-16) numbers separated by colons.

An IP address can be either dynamic or static. A static address is one that a user can edit and it is less common. Dynamic addresses are assigned by the Dynamic Host Configuration Protocol (DHCP), a service running on the network. DHCP typically runs on network hardware such as routers or dedicated DHCP servers.

Dynamic IP addresses are issued using a leasing system, meaning that the IP address may be active for a limited time. If the lease expires, the computer may automatically request a new lease. Sometimes, this means the computer may get a new IP address, too, especially if the computer was unplugged from the network between leases. This process is usually transparent to the user unless the computer warns about an IP address conflict on the network (two computers with the same IP address).

Information in the IP Address may be used to identify users, devices, geographies, and networks.

A system may include multiple servers 104*a*-*c* stored in high-density rack systems. If the servers are part of a common network, they do not need to be physically near one another but instead may be connected by a wide-area network (WAN) connection or similar connection.

Management of group of networked servers may be de-centralized. For example, one or more servers 1041-*c* may include modules to support one or more management services for networked servers including management of dynamic data, such as techniques for handling failover, data replication, and increasing the networked server's performance.

The servers 104*a*-*c* may be file servers, application servers, web servers, proxy servers, network appliances, gateways, gateway servers, virtualization servers, deployment servers, SSL VPN servers, or firewalls.

When the network 110 is in a cloud environment, the cloud network 110 may be public, private, or hybrid. Public clouds may include public servers maintained by third parties. Public clouds may be connected to servers over a public network. Private clouds may include private servers that are physically maintained by clients. Private clouds may be connected to servers over a private network. Hybrid clouds may, as the name indicates, include both public and private networks.

The cloud network may include delivery using IaaS (Infrastructure-as-a-Service), PaaS (Platform-as-a-Service), SaaS (Software-as-a-Service) or Storage, Database, Information, Process, Application, Integration, Security, Management, Testing-as-a-service. IaaS may provide access to features, computers (virtual or on dedicated hardware), and data storage space. PaaS may include storage, networking, servers or virtualization, as well as additional resources such as, e.g., the operating system, middleware, or runtime resources. SaaS may be run and managed by the service provider and SaaS usually refers to end-user applications. A common example of a SaaS application is SALESFORCE or web-based email.

A client 102*a*-*c* may access IaaS, PaaS, or SaaS resources using preset standards and the clients 102*a*-*c* may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1B:
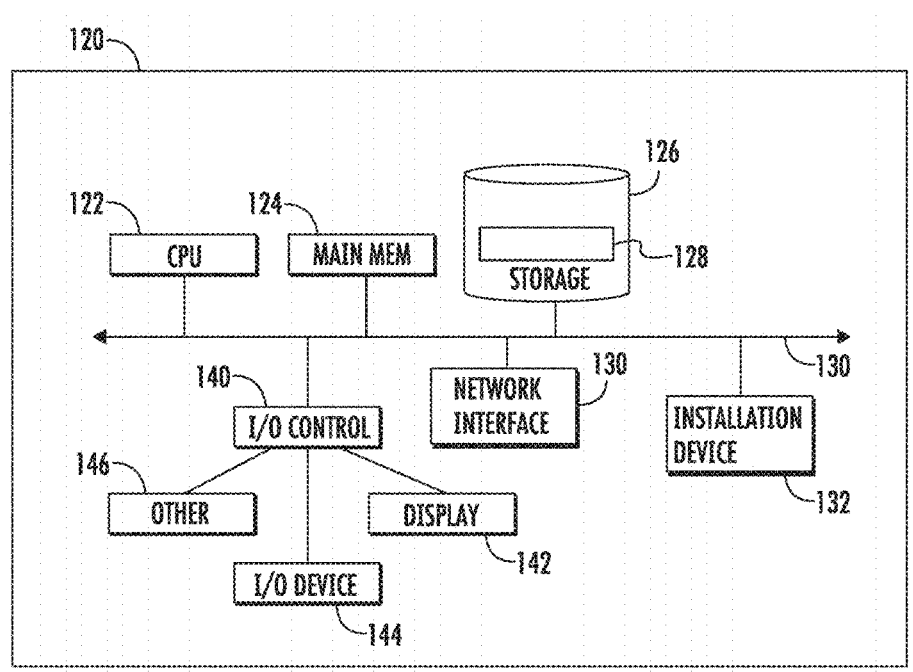
FIG. 1B shows block diagrams of a computing device.
Figure 1C:
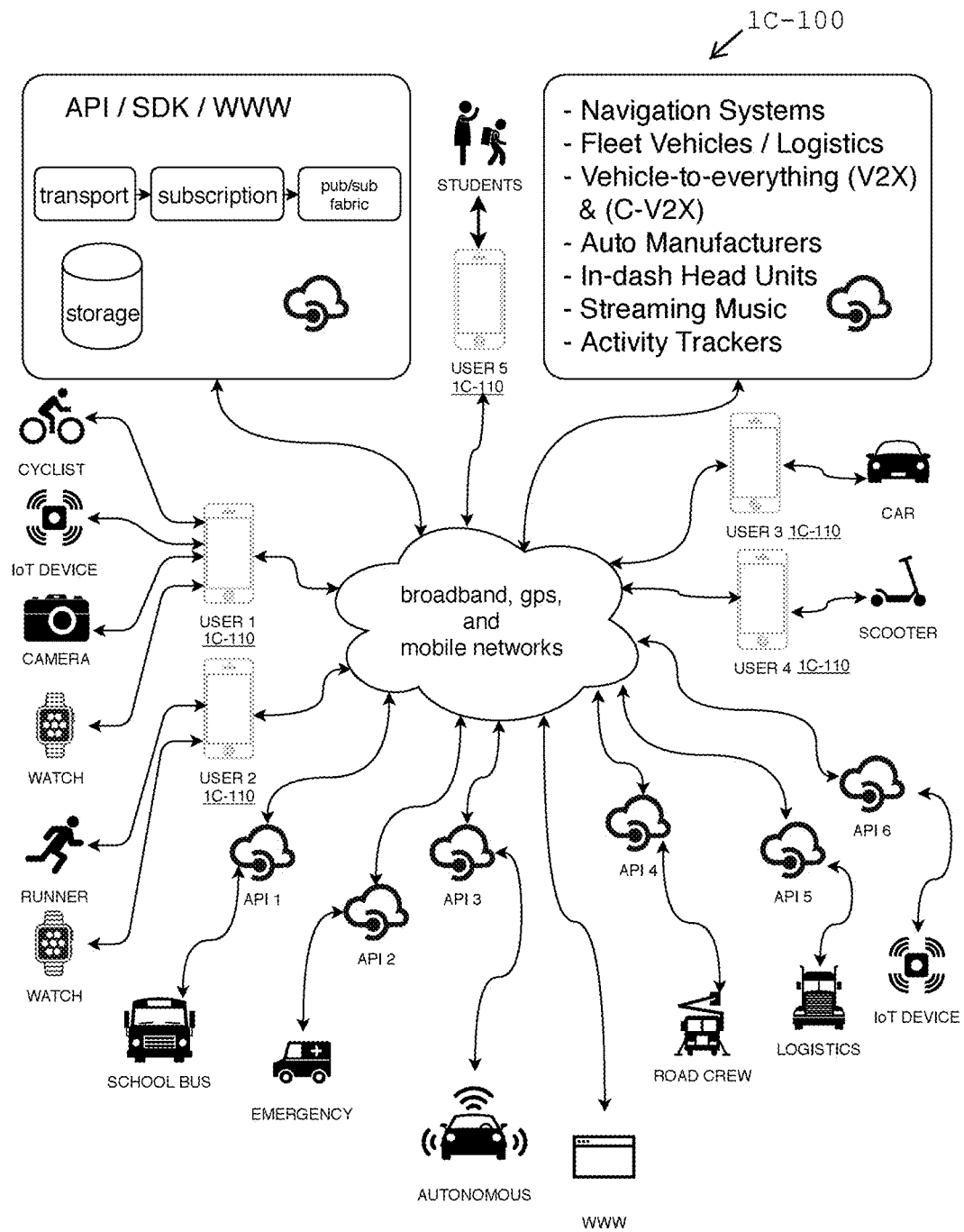
FIG. 1C shows a high-level overview of the EPAAS system.

The clients 102*a*-*c* and servers 104*a*-*c* may be embodied in a computer, network device or appliance capable of communicating with a network and performing the actions herein. FIGS. 1B and 1C show block diagrams of a computing device 120 that may embody the client or server discussed herein. The device 120 may include a system bus 150 that connects the major components of a computer system, combining the functions of a data bus to carry information, an address bus to determine where it should be sent, and a control bus to determine its operation. The device includes a central processing unit 122, a main memory 124, and storage device 124. The device 120 may further include a network interface 130, an installation device 132 and an I/O control 140 connected to one or more display devices 142, I/O devices 144, or other devices 146 like mice and keyboards.

The storage device 126 may include an operating system, software, and a service agent module 128, in which may reside the service agent logic and method described in more detail below.

The computing device 120 may include a memory port, a bridge, one or more input/output devices, and a cache memory in communication with the central processing unit.

The central processing unit 122 may be a logic circuitry such as a microprocessor that responds to and processes instructions fetched from the main memory 124. The CPU 122 may use instruction level parallelism, thread level parallelism, different levels of cache, and multi-core processors. A multi-core processor may include two or more processing units on a single computing component.

The main memory 124 may include one or more memory chips capable of storing data and allowing any storage location to be directly accessed by the CPU 122. The main memory unit 124 may be volatile and faster than storage memory 126. Main memory units 124 may be dynamic random-access memory (DRAM) or any variants, including static random-access memory (SRAM). The main memory 124 or the storage 126 may be non-volatile.

The CPU 122 may communicate directly with a cache memory via a secondary bus, sometimes referred to as a backside bus. In other embodiments, the CPU 122 may communicate with cache memory using the system bus 150. Cache memory typically has a faster response time than main memory 124 and is typically provided by SRAM or similar RAM memory.

Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Additional I/O devices may have both input and output capabilities, including haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures.

In some embodiments, display devices 142 may be connected to the I/O controller 140. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays.

The computing device 120 may include a network interface 130 to interface to the network 110 through a variety of connections including standard telephone lines LAN or WAN links (802.11, T1, T3, Gigabit Ethernet), broadband connections (ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols. The computing device 120 may communicate with other computing devices via any type and/or form of gateway or tunneling protocol such as Secure Socket Layer (SSL) or Transport Layer Security (TLS). The network interface 130 may include a built-in network adapter, network interface card, PCMCIA network card, EXPRESSCARD network card, card bus network adapter, wireless network adapter, USB network adapter, modem or any other device suitable for interfacing the computing device 120 to any type of network capable of communication and performing the operations described herein.

The computing device 120 may operate under the control of an operating system that controls scheduling of tasks and access to system resources. The computing device 120 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system 120 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication.

The status of one or more machines 102a-c, 104a-c may be monitored, generally, as part of network management. In one of these embodiments, the status of a machine may include an identification of load information (the number of processes on the machine, CPU and memory utilization), of port information (the number of available communication ports and the port addresses), session status (the duration and type of processes, and whether a process is active or idle), or as mentioned below. In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above may become apparent in the context of the systems and methods disclosed herein.

FIG. 1C shows a high-level overview of the ePaaS system 1C-100. The ephemeral Proximity as a Service ecosystem provides users 1C-110 with the ability to share their proximity free from privacy concerns. Participating in the ePaaS ecosystem to share real-time position and proximity does not require the use of personal identifiable user information. The method of such sharing the position, proximity, and associated messages via ePaaS may only rely on the cloud services storing the user's last known position by default—nothing else need be stored.

FIG. 1C depicts a robust ecosystem in the transportation field connecting navigation systems, fleet vehicles, logistics platforms, Vehicle-to-everything (V2X) infrastructure, Cellular vehicle-to-everything (C-V2X), auto manufacturers, in-dash head units, streaming music services, and activity trackers. The ePaaS service is not limited to these providers or markets and may be used in financial services, insurance, customer management, and social platforms to name a few, in spite of the examples discussed herein mostly being directed to transportation.

This ePaaS ecosystem may offer connections to its API and SDK to any phone, IoT device, bike, scooter, watch, camera or application that offers or would benefit from the connection to a latitude and longitude positional awareness (that may also include altitude) and consumer privacy.

Further the ePaaS ecosystem may offer existing platforms, operating systems, and application environments the ability to offer their user base a way to share their location services with the applications that rely on it—enabling "ephemeral sharing." For example, until recently phones have enabled users to share their location "always," "only while using the app," or "never." With ePaaS enabled applications users may choose "always and ephemeral" or "ephemeral while using app" options.

One example of a use case outside of the transportation industry is a weather app that connects to ePaaS services to receive the real-time location of the user and provide them with a weather forecast in a manner that meets the location sharing interests of the user-either "always and ephemeral"

or "ephemeral while using app." At this time, there are no means for users to enable location services and disable the application provider's ability to store this location history.

The ePaas System Introduction

The ePaaS system allows users to share location data in a privacy-compliant manner, one where each user's location data is being shared in a fully anonymous form. By default, the user's location/proximity data is shared in a form where the user information is not tracked. An initial use case shares the data in the form of beacons, which would be a pair of latitude and longitude points, along with some metadata that the user may share as the decide. In this use case, the system passes along what kind of activity the user is doing: For example, biking or driving, but this nonlimiting case could expand to more types of metadata, such as emergency events, weather events, and other use cases. An API/SDK service may allow creative developers to incorporate their own applications, all built from EPAAS system that protects user information as described herein.

The ePaaS system backend enables the sharing of location data with target groups or channels (for example, a biker may share location with drivers, so they are aware of bikers' locations), in a privacy-sensitive and compliant manner. It may not require identification of the user unless the user wants to make the data history publicly available or to share it with specific groups or individuals. This is different from existing systems that require users to sign up and tie the data with their identity and personal information at all times.

The communication channel nay use web-based technology with the prospect of further optimizing the communication protocol. TLS (successor of SSL) may be used to encrypt the data feed that may be sent to the ePaaS backend. This minimizes the surface of attack for man-in-the-middle attacks. gRPC or HTTPS may be used at the application level according to the OSI model. The payload itself may be transmitted in the form of Protobuf or JSON payloads, respective to the Application level protocol. This allows the efficient use of the mobile device battery in order to transmit the location.

The services may expect/transport the minimal data payload at all times. This may allow high performance and near real-time proximity detection. When using gRPC the user may create a single connection that can be re-used in order to send subsequent location changes. The services may not store the sequence of location data but may remember for a very short period of time the last location of the user. This may be used by the service to securely map-match the proximity with other parties that share their location.

When using a JSON payload, the data may contain a "session identifier" generated cryptographically random and may not be seeded or based on anything related to the identity of the user. The lifetime of the "SI" may be based on a user preference, as it may be generated by the user's device—the user can change the "SI" at any time. The "SI" may change at least on each sharing session.

The continuous connection of the "SI" is needed in order for the service to de-duplicate location data and prevent unnecessary nuisance.

The first implementation of ePaaS may be used to match the proximity of cyclists and drivers, which may allow alerting of the users to be careful when approaching each other. The proximity computation may happen on the server/service side, in this way it is a closed system and the service does not share any other information with the other users of the system. The response of the service may be based on the presence or absence of the proximity and possibly metadata about different proximities—that may result in messages. For example, the service may send messages that cars are passing by at 20 meters, cars are approaching at 40 meters and other bikers are 15 meters away.

Further, the service may allow near real-time proximity to other users. Today's common hazard feeds in the transportation industry have a latency of between 7 to 20 seconds and are for fixed-position hazard warnings for the likes of "pothole" and "car stopped on the roadside," and thus no ephemeral proximity messaging feed like this has existed. The proximity can be set up between different groups of users. Users can also pass the actual location of a user, to individuals, groups, or even make it public, when the user authorizes such sharing.

Location sharing may be done by providing an optional parameter in the API of the backend.

Some users might want to record and view their historical location, routes, and rides. This may be achieved by having the application record location data locally on the device. That way the user owns the data in its entirety. When the user wants to share their location publicly, then the user may need to register (including personal data) with system services using a well-established security mechanism called OpenId Connect. OpenId Connect may use an authentication and authorization framework that allows the user to manage who has access to the data and when the user decides to share the data, the historical data may be uploaded to our services in a GDPR/CCPA compliant manner. The system may use the user's actual location to automatically identify and store the user's activities in a proper manner that includes storing the user's data in our services and databases that are hosted in the actual country location where that user is physically located—a GDPR requirement. These shared histories may be made available to the users, channels, and platforms that the user approves if they choose to do so. Revoking access means that the location history of the user may be removed.

States of ePaas

The user may set their data state on their device, is it relates to the ePaaS platform and other users, to one of several pre-determined states in ePaaS.

Encrypted Verified User Info

This may be an entirely optional state that is presented to the user that would enable the user to share their detailed beacon history with individuals, groups, or channels through a connected cloud service and by storing their detailed beacon history along with their personal account info.

Ephemeral and Anonymous

This is the state when a user is anonymous with the platform and the platform does not associate them with any registered user. Session IDs generated by the user's application identify communications as they enter the system. The user is free to change this ID as desired.

Data entering the system is not stored but immediately evaluated for proximity map-matches with other related sessions. If a match is found, an event/message is generated. The data is then permanently deleted.

Local Stored Privately

In addition to Ephemeral proximity, a user/application can of course freely store data locally this is not data the platform may have access to because it is stored on a user's local device (phone/hardware/cloud). This state may give the user control over all of their data.

Shared Limited Access

When a user wants to share data, they may need to authenticate to the platform, they can then share their ephemeral data feed with users they select in this state.

The data may be stored in one of two ways—either shared with the user in an ephemeral manner and is not stored in the platform or shared through and stored on the platform services as described previously in a GDPR/CCPA compliant manner.

Public Freely Available

Similar to Limited access shares the user must be authenticated to share publicly which is what they can do in this state.

Detailed Description of ePaas and Figures

FIG. 2 shows optional registration via mobile device method. This optional registration method associated with a mobile device follows a typical registration method on a mobile device. This method is shown at a high level in later figures in detail but shows at least that registration may not be associated with the ephemeral beacons, alerts, or messages associated with ePaaS and it may be required when the user would like their beacons, alerts, or messages to be stored in the cloud.

As shown in FIG. 2, during registration, a user's phone number may be collected 1-01, the confirmed by SMS 1-02, which is confirmed 1-04 and matched 1-05. If unmatched, the system sends a new SMS 1-03. If matched, the system creates an account 1-06 and collections optional information 1-07.

FIG. 3A shows an ephemeral beacons method depicting the method of the user activating the ephemeral beacons associated with ePaaS along with subsequent options for how those beacons could be shared outside of the default ephemeral and anonymous state. This is a single user path that explores the options associated with this method.

The data may be stored in one of two ways—either shared publicly in an ephemeral manner and is not stored in the platform or shared through and stored on the services as described previously in a GDPR/CCPA compliant manner.

FIG. 3A is a flow diagram showing the activation the of the ephemeral beacon. In 3A-01 the user activates the service through the use of a connected service through an app, web, page, IoT device, vehicle, activity tracker or other connected system. Once the service is activated a Session Identifier is generated and sent to the ePaaS-connected service. This session identifier may be controlled by the user and may be re-issued in accordance with their preferences as this is the identifier that validates the user on the connected service. This session identifier provides an anonymous means for identifying the user on the connected platform without requiring personal information. After the service is launched the activity type is set in 3A-02. This activity type is either manually or automatically set to activities that include but are not limited to "bike rider," "vehicle driver," "runner," "emergency vehicle driver," "roadside crew worker," and "none." This activity type is sent to the service. With the session ID and the activity type set the ephemeral beacon is activated automatically in 3A-03 which sends the session ID, activity type, latitude, longitude, and any other metadata that may be collected to the connected ePaaS service at the user's frequency preference or the use cases required frequency—which may be every second or any other time interval as needed.

This information may also be sent to the user's local storage device in accordance with the users' storage preferences. When the session ID, activity type, latitude, longitude, and any other metadata is sent to the service at the next frequency interval, the current latitude and longitude are compared with the prior latitude and longitude and a calculation is performed to measure the speed and direction of connected device. When this calculation is complete the resulting values along with the current information received replaces all of the information previously stored on the connected service. In this manner the connected ePaaS service stores the most recent information known including session ID, activity type, latitude, longitude, speed, and direction. All outdated information is deleted and replaced with the current information every time the connected device sends the service the latest information and the related calculations are completed. At the user's preference, all of their location and data may be saved on the user's device and or personal connected cloud storage service.

If after launching the service the speed is unreasonable, that is, beyond a threshold that would make sense, the auth is rejected.

A user may launch ePaaS services at 3A-01 without providing any personal identifiable account information. A "session identifier" (SI) may be generated cryptographically random and may not be seeded or based on anything related to the identity of the user. The lifetime of this "SI" may be based on a user preference, as it may be generated by the user's device—the user can change the "SI" at any time. The "SI" may change at least on each sharing session. The continuous connection of the "SI" is needed in order for the service to de-duplicate location data and prevent unnecessary nuisance.

Additionally, whitelisted device identification numbers may be used when available to provide additional or enhanced features to the trusted devices.

FIG. 3B is a flow diagram showing how ephemeral alerts are activated and received. In 3B-01 the user activates the service through the use a connected service through an app, web, page, IoT device, vehicle, activity tracker or other connected system. Once the service is activated a Session Identifier is generated and sent to the ePaaS-connected service. This session identifier may be controlled by the user and may be re-issued in accordance with their preferences as this may be the identifier necessary to validate the user on the connected service. This session identifier provides an anonymous means for identifying the user on the connected platform without requiring personal information. After the service is launched the activity type is set and the beacon is activated in 3B-02. For further details on this process, see the flow diagram in FIG. 3A. With the session ID and the activity type set the ephemeral beacon is activated automatically in 3B-02. In addition and during 3B-02, when the activity type is set, the "safety bubble" size and shape is also set—for example it could be set to a circle that is 50 meters but its size and shape may be customizable and also further edited and affected by the user's preferences and may be activity-type specific that may further change shape and size based on the current speed and direction of any given activity—either the activity session that is causing/generating the message or the activity session that is receiving the message. Further, this "safety bubble" can also be oriented on a map based on the direction and speed that the user us traveling. This "safety bubble" is used to generate and provide alerts and/or messages when other users on the platform or associated geographically tagged messages enter the user's safety bubble. The "safety bubbles" may act as public "moving channels" that users may publish to and subscribe to.

Once the beacon and activity type have been set the service may begin to poll for any applicable alerts to generate in 3B-03. This polling happens at a frequency that is either set by the user or by the use case at the ePaaS service level. For example, this could be set to poll at one-second intervals. When this polling occurs, the service may plot the user's current latitude, longitude, speed, and direction on a map along with the user's "safety bubble" and its specific orientation and size and then compare that with the surrounding locations of the other current user's. If there are other users that are within the safety bubble of the current user, those users are further analyzed as in 3B-04 to determining if alerts should be generated. In this case 3B-04 shows one possible criterion for providing alerts to a "bike" and a "car" that may be generated when a current user or use case/activity type enters the "safety bubble" of the current user. In this case alerts are determined. In 3B-05 that determination is set and for example the bike activity users may get alerts when a car activity user's user enters their safety bubble and vice versa, and both "bike" and "car" users would receive their appropriate messages which could be audio, video or animations in 3B-07. These messages may not be stored on the ePaaS service.

The messages along with the session ID, activity type, latitude, longitude, speed, velocity, and any other metadata that may be associated with the ephemeral message may be sent to the user's local storage device in accordance with the users' storage preferences. In this manner the connected ePaaS service may only store the most recent information known including session ID, activity type, latitude, longitude, speed, and direction.

FIG. 3C is a flow diagram depicting how ephemeral messages are generated and shared. Steps 3C-01 and 3C-02 launch the ePaaS service in a manner identical to FIG. 3B after which point the user creates a message in 3C-03. This message can be an audio recording, text, or video and may contain meta data that includes things like numerical values including speed, distance, the relative size of a vehicle, the counts of the number of vehicles that and their proximity in measured or calculated distance from the user. This information can either be manually input by the user or generated automatically through the device that the ePaaS service is running on or through a connected device that may include an IoT device or edge computing device. The frequency of these recordings could be ad-hoc or regular as in every second for example. After the user or connected device has created the message, the message is saved to the user's local storage device with its time and date stamp along with the related latitude, longitude, speed, activity type, and tagged in the proper activity-based channel or channels. 3C-04 is the point at which it is determined if the user or system's preference is to share the message ephemerally. If the user has set their preference or the system is set to share the message ephemerally then the message is shared as stated in 3C-06. This shared message is published to the appropriate activity channels and safety bubbles so that it may be received by users who subscribe to the associated channels and safety bubbles in real time.

The messages may be stored only temporarily until they get bumped out either by the next message or the predetermined amount of time for the specific use case. In this way, the platform server-side acts as message router. The user may store the messages and alerts they receive, but the system server side may not. Said another way, the message is never stored on ePaaS services. Additionally, the message and the related metadata are stored on the user's device as illustrated in 3C-05.

3C-08 begins the reprocess of sharing the message with specific users. This process requires the user be logged in as shown in 3C-09. During this step the user authenticates to the platform with typical personal information that may include email, phone number, and name. Once the user is logged in and authenticated to the platform the user may select other authenticated users that they would like to share messages with by individual user, specific channels or safety bubbles as shown ion step 3C-10. Additionally, the user can decide to make the message public as shown in 3C-12. The "shared limited access" and "public freely available" states may always be attributed to the user's account as they have authenticated themselves in the 3C-09. These messages may not be stored on ePaaS services, may always be stored on the user's device and, may be available to be shared through API and SDK connections to be shared and stored in accordance with the user's preferences.

Once the message has been sent and confirmed to have been received, the message may cease to exist in the ePaaS service and all that may remain is a confirmation of the message delivery.

FIG. 4 shows the flow of autodetecting the activity type associated with an active user session. After activating the service in 4-01 in a manner like that shown in FIG. 3A, if the user has not selected their activity type, an auto detection begins in step 4-04 and the connected-device polls for changes in latitude and longitude. If there is a change in the position of the user in a predetermined amount of time the connected device may then poll available accelerometer and gyroscope readings as shown in 4-06 from the phone or connected device and further, if a smart watch or activity tracker is connected to the user's device the device may poll its available accelerometer, heart rate, and gyroscope readings as shown in 4-08. This information is used to determine session type at the device level. For example, if the user has an elevated heart rate and is traveling at a rate of speed that is faster than a runner, but the accelerator implies a smooth and non-jarring activity, the user is likely biking.

Personal health data including heart rate is not shared with or ever stored in the ePaaS system, they measurements are ever used in calculations that occur on connected device, and the activity type alone may be shared with the ePaaS system.

FIG. 5 is a flow diagram detailing the method for grouping ephemeral messages. After launching the service as shown in 5-01, selecting the activity type in 3B-02, and polling for alerts in 5-03 in a manner like FIG. 3B, the grouping of activities starts in 5-07 to provide the most meaningful alerts that are in areas and during times of day where it may not be practical or beneficial to generate individual messages, for instance in in cities with large population densities. These locations may have adjustable size geographical channels that may be generate based on location, time of day, and activity type. When two or more activities are in close proximity of each other and they are headed in the same direction they may be grouped to consolidate the message volume. The activity types may be grouped starting with polling the service for activities that are in close proximity of each other that are also headed in the same direction FIG. 6 shows a flow diagram of the method of sharing the activity history of the user. In 6-01, 6-02, and 6-03 the user launches the service, selects their activity, and activates their ephemeral beacon in the same manner as FIG. 3A. If the user's preference is set to not share the activity and message details associated with an activity or series of activities, as shown in 6-05, it may only be saved on the users device and/or in the user's cloud storage location including but not limited to a cloud storage. The details associated with an activity may include all geolocation information platted as points or a continuous line on a map made up of latitude, longitude, speed, direction, and all related metadata collected from connected devices including but not limited to audio recordings, text, or video and may contain meta data that includes things like numerical values including speed, distance, the counts of the number of vehicles that and their proximity in measured or calculated distance from the user along with information on the channels and safety bubbles subscribed to.

If the user has decided to share their activities, they may be required to log in as shown in 6-06. After authenticating to the ePaaS service, the user can decide how they would like to share the activity. If they decide to share the activity with specific users in 6-08, the user may select other authenticated users that they would like to share message with by individual user, specific channels or safety bubbles as shown ion step 6-09. This information may be made available to other users in real-time. If the user who the information is shared with is not connected to the service, the information may no longer be available to them to view to for storage.

When the user sets the preference to share the information publicly as shown in 6-10, the information is available for download in the public channel in real time. This activity and its details may become available to all connected users who have joined the public channel. This makes the activity available for download to other users who subscribe to public channels at the moment the activity history is created and the services acts as a router publishing the information to the appropriate channels for subscription but not storage.

The "shared limited access" and "public freely available" states may be attributed to the user's account as they have authenticated themselves in the 6-06. These details may not be stored on ePaaS services, may always be stored on the user's device and, may be available to be shared through API and SDK connections to be shared and stored in accordance with the user's preferences.

For the purpose of defining the term "user(s)" as those people or entities that the information is shared with—they all may have authenticated accounts associated with ePaaS however they can further be defined as people or the APIs that can be associated with individual or corporate accounts.

FIG. 7 is an illustration that shows two factors of the "safety bubbles" or channels. As seen in 8-01 and 8-03 the "safety bubbles" for the CYCLIST and CAR are illustrated as being the same size and shape. These "safety bubbles" can be any shape, size, and also can be further directionally aligned and dependent on the time of day. For example when biking in New York city at midnight the "safety bubble" of a cyclist could be a 50 meter circle or it could be a 50 meter rectangle that is 1 meter wide with the cyclist plotted in the middle of it or it could be just a point known to the system as the latitude and longitude location of the cyclist. The relative sizes and shapes of the "safety bubble" may have automatic parameters associated with them as well as user definable controls.

Further as seen in 8-04 each interaction between types of activities may have an associated decision matrix associated with it to determine if an alert is played when safety bubbles intersect with each other. The intersection and overlap point is illustrated in 8-02. As shown in 8-04 in a case when a CYCLIST and a CAR have their "safety bubbles" intersect or overlap with each other the alerts are played to both users. However, when a CAR and a CAR have their safety bubbles intersect or overlap an alert is not played for either user. Further, these decision matrices can also have time of day and location dependencies that may alter the output.

The term alerts in this case can include any form of output including audio, video, or animation and individual alerts can be grouped into single indicators to give users more meaningful feedback.

FIG. 8 shows multiple user ephemeral proximity alerts methods. This is how users broadcast their proximity and receive ephemeral message and proximity alerts. This is the functionality at the core of the platform which makes other features work. This diagram shows 2 platform users, they could be connected machines, people connected via their machines or anything else that wants to share its proximity with other things. At 9-01a and 9-01b, the user of the platform connects—there may be no personally identifiable information involved the connection is considered anonymous and the client sets a session id that can be changed to avoid even anonymous tracking of the same user.

The connection can subscribe to channels where like ephemeral positional information is shared. This might be a channel for the biking application which helps bikers and motorists share their positions for safety.

At 9-02a and 9-02b, the user shares position information with the platform at latency intervals pertinent to the use case. The platform treats this data in this manner:

As mentioned before no personally identifiable information is available to the platform, it is not possible for even the platform to know who a user is as they report.

Only the last location may ever be known at any given time, location is treated as ephemeral and therefore good for the time period the use case permits. In the case of cycling safety, a position reported by a bike may live in the platform for a second since it wouldn't make sense to keep it longer Any other meta data may be attached to this location to make the use cases for sharing limitless.

At 9-03, based on feed of incoming Ephemeral updates proximities for 2 events are matched up whenever new updates are submitted. Based on the use case the match occurs when 2 Ephemeral Updates geographically overlap within the use cases zone. For example, with bikers and motorists a 50-meter perimeter around each might be the zone used for these calculations, when a bike and car get closer than 50 meters then an event is generated.

At 9-04a and 9-04b, as described in Proximity Calculation when events are generated due to Ephemeral Proximity overlaps, these events are sent to the connected users involved in the calculation. Depending on the use case the platform may send positional information or may just generate an event for the entire zone. Events may always be:

Ephemeral—never stored after they are sent
    set to not contain personally identifiable information, anonymous.

While the invention has been described with reference to the embodiments above, a person of ordinary skill in the art would understand that various changes or modifications may be made thereto without departing from the scope of the claims.

The invention claimed is:

1. An ephemeral Proximity as a Service (ePaaS) system comprises:
   at least two user devices connected to a network, wherein the user devices are able to communicate with each other in two directions, wherein the user devices establish communication channels with the network using a session identifier;
   location services in communication with user devices that allow user devices to communicate location information to one another;
   wherein the communication is stored and/or shared for a predetermined time as determined by the user device's location, activity, or predetermined setting, wherein the predetermined settings comprise at least a customizable safety bubble within which the user devices can communicate with one another using alerts and/or messages when users of the ePaaS system enter the safety bubble; and wherein the communications are data that a user can share by setting a data state on the user device, wherein the state is selected from one of: (1) an Encrypted Verified User Info state that enables the user to share a user history through a connected cloud service and stores a user history along with personal account information; (2) an Ephemeral and Anonymous state that allows a user to be anonymous on the network through the use of a randomly generated session identifier and after a communications channel is closed, the session identifier is deleted; (3) a Local Stored Privately state that allows a user to store user data locally on the user device; (4) a Shared Limited Access state that allows a user share user data with select users; and (5) a Public Freely Available state in which the user shares user data with all other users.

2. The ephemeral Proximity as a Service (ePaaS) system of claim 1, wherein the system assists in networked travel of users through sharing real-time geolocations, providing proximity alerts, recording and sharing messages that include audio, video, images, or text through an encrypted technology platform that offers user-initiated privacy controls.

3. The ephemeral Proximity as a Service (ePaaS) system of claim 1, wherein the users are performing certain activity types and the system determines the activity type automatically.

4. The ephemeral Proximity as a Service (ePaaS) system of claim 1, wherein the communications include beacons, alerts, and/or messages.

5. The ephemeral Proximity as a Service (ePaaS) system of claim 4, wherein the beacons include ongoing one-way communications to users of the network.

6. The ephemeral Proximity as a Service (ePaaS) system of claim 4, wherein the alerts are notices received and created by users.

7. The ephemeral Proximity as a Service (ePaaS) system of claim 6, wherein the alerts are activated when a user enters a geographic proximity of the safety bubble defined as a proximity to a user.

8. The ephemeral Proximity as a Service (ePaaS) system of claim 1, wherein the safety bubble is activity-type specific and changes shape and size based on the location, current speed, and direction of a user activity.

9. The ephemeral Proximity as a Service (ePaaS) system of claim 1, wherein the at least two user devices communicate metadata including text, images, audio and videos.

10. The ephemeral Proximity as a Service (ePaaS) system of claim 1, wherein the user devices communicate with services in two directions.

11. The ephemeral Proximity as a Service (ePaaS) system of claim 10, wherein the services comprise activity trackers.

12. The ephemeral Proximity as a Service (ePaaS) system of claim 10, wherein the services comprise API services.

13. The ephemeral Proximity as a Service (ePaaS) system of claim 1, wherein a user must be authenticated to set the data state on the user device.

14. The ephemeral Proximity as a Service (ePaaS) system of claim 1, wherein messages shared with a user on the network are not stored on the network.

15. The ephemeral Proximity as a Service (ePaaS) system of claim 1, wherein the location information includes latitude and longitude information.

* * * * *